US010139904B2

(12) United States Patent
Dow et al.

(10) Patent No.: US 10,139,904 B2
(45) Date of Patent: *Nov. 27, 2018

(54) ADJUSTMENT OF RETICLE DISPLAY BASED ON BIOMETRIC INFORMATION

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Emily M. Metruck, Poughkeepsie, NY (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/926,994

(22) Filed: Oct. 29, 2015

(65) Prior Publication Data
US 2017/0090561 A1 Mar. 30, 2017

Related U.S. Application Data

(63) Continuation of application No. 14/865,782, filed on Sep. 25, 2015.

(51) Int. Cl.
*G06F 3/01* (2006.01)
*G06T 11/60* (2006.01)
(Continued)

(52) U.S. Cl.
CPC .............. *G06F 3/013* (2013.01); *G06F 3/011* (2013.01); *G06F 3/017* (2013.01); *G06F 3/038* (2013.01);
(Continued)

(58) Field of Classification Search
None
See application file for complete search history.

(56) References Cited

U.S. PATENT DOCUMENTS

2003/0038754 A1* 2/2003 Goldstein ............... G06F 3/013
345/7
2013/0117182 A1* 5/2013 Bhogal ............. G06F 17/30755
705/44
(Continued)

OTHER PUBLICATIONS

Eli M. Dow, et al., "Adjustment of Reticle Display Based on Biometric Information," U.S. Appl. No. 14/865,782, filed Sep. 25, 2015.
(Continued)

*Primary Examiner* — Xiao Wu
*Assistant Examiner* — Steven Elbinger
(74) *Attorney, Agent, or Firm* — Cantor Colburn LLP

(57) ABSTRACT

An embodiment of a computer implemented method of displaying textual data includes receiving a request to display textual data and displaying textual data in a region within a display area. Displaying textual data includes sequentially presenting successive components of the textual data at a fixed position relative to the display area. The method also includes monitoring a point of gaze of a user based on biometric information, and based on detecting that the point of gaze is away from the region, automatically stopping the displaying by the processor at a time point corresponding to a current component, and determining a previous component of the textual data displayed at a previous time point. The method further includes, based on detecting that the point of gaze has returned to the region, commencing by the processor the displaying at the previous component and continuing to display successive components of the textual data.

11 Claims, 4 Drawing Sheets

(51) Int. Cl.
- *G06F 3/0485* (2013.01)
- *G06F 3/0488* (2013.01)
- *G06F 15/02* (2006.01)
- *G06F 3/038* (2013.01)
- *G06F 3/0483* (2013.01)
- *G06F 21/32* (2013.01)

(52) U.S. Cl.
CPC .......... *G06F 3/0483* (2013.01); *G06F 3/0485* (2013.01); *G06F 3/0488* (2013.01); *G06F 15/0291* (2013.01); *G06F 21/32* (2013.01); *G06T 11/60* (2013.01); *G06F 2203/011* (2013.01)

(56) References Cited

U.S. PATENT DOCUMENTS

| | | | |
|---|---|---|---|
| 2014/0253437 A1* | 9/2014 | Vaught | G02B 27/017 345/156 |
| 2015/0128075 A1* | 5/2015 | Kempinski | G06F 3/012 715/765 |
| 2016/0034133 A1* | 2/2016 | Wilson | G06F 3/0488 715/772 |
| 2016/0062953 A1* | 3/2016 | Yoakum | G06F 17/211 715/271 |
| 2016/0080720 A1* | 3/2016 | Fullam | A61B 3/00 345/156 |

OTHER PUBLICATIONS

List of IBM Patents or Patent Applications Treated as Related; POU920150237US2, Dated Oct. 29, 2015, 2 pages.

\* cited by examiner

US 10,139,904 B2

ADJUSTMENT OF RETICLE DISPLAY BASED ON BIOMETRIC INFORMATION

DOMESTIC PRIORITY

This application is a continuation application of the legally related U.S. Ser. No. 14/865,782, filed on Sep. 25, 2015, the contents of which are incorporated by reference herein in their entirety.

BACKGROUND

The present invention relates generally to displaying information for a user, and more specifically, to adjusting a display to a user based on biometric information.

SUMMARY

An embodiment of a computer implemented method of displaying textual data includes receiving, by a processor, a request to display textual data and displaying, by the processor, textual data in a region within a display area. Displaying textual data includes sequentially presenting successive components of the textual data at a fixed position relative to the display area. The method also includes monitoring a point of gaze of a user based on biometric information, and based on detecting that the point of gaze is away from the region, automatically stopping the displaying by the processor at a time point corresponding to a current component, and determining a previous component of the textual data displayed at a previous time point. The method further includes, based on detecting that the point of gaze has returned to the region, commencing by the processor the displaying at the previous component and continuing to display successive components of the textual data.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Apparatuses, systems and methods are provided for displaying text and other visual information. An embodiment of a method includes displaying textual data as a text stream in a reticle or other region of a display area, such as the screen of a computer or mobile device. The rate of display may be adjusted in response to various factors, such as biometric measurements indicative of fatigue and/or stress. During display, a user's gaze is monitored to determine whether the user is looking at the displayed textual data. In response to determining that the user's gaze has broken (i.e., the direction of gaze is away from the region in which the textual data is displayed), the text stream is paused and rewound by a selected period of time to a location in the text stream that precedes the location in the textual data that was displayed when the gaze was broken. Based on the user's gaze returning to the region, the text stream is automatically resumed from the preceding location.

Figure 1:
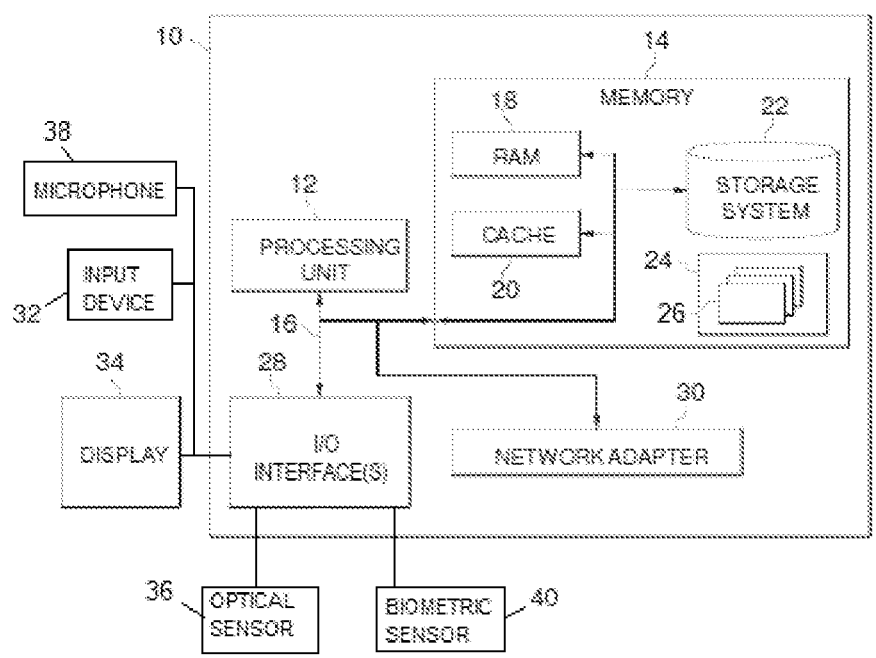
FIG. 1 depicts a processing device in accordance with an embodiment.

FIG. 1 illustrates an example of a device 10 that can be used to display data and track biometric information as described herein. The device 10 is configured to store and process data, execute programs and display information to a user, such as textual, alphanumeric, symbolic and other visual information. In one embodiment, the device is configured to receive or gather communications (e.g., text, spoken words, emails) from other locations, such as a network (e.g., Internet) and/or another processor (e.g., server, computer, mobile device). The device 10 may be any device capable of displaying text and other information to a user, such as a mobile device (e.g., a smartphone) a wearable device (e.g., a smartwatch), a tablet computer, a laptop computer, a desktop computer, a mainframe a server and others.

The device 10 includes various components and/or modules for performing various processing, sensing and display functions. The device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The device includes or is connected to various components, which may be incorporated in the device 10 or external to the device 10. The device 10 includes various interfaces 28 for communication with components and may also include a network adapter 30 for communication with other devices or components over a suitable network or remote connection. The device 10 is connected to or includes at least one input device 32 such as a keyboard, mouse and/or touchscreen, and a display 34. The components shown in FIG. 1 and described herein are provided for illustrative purposes and are not intended to be limiting.

The device 10 also includes one or more sensors for receiving input information from a user and for monitoring and detecting biometric information related to the user. biometric sensors. As described herein, "biometric information" refers to any type of information that can be acquired by a sensor for measuring and analyzing characteristics of the human body. Examples of biometric information include, but are not limited to, facial characteristics, eye characteristics (e.g., gaze direction), body movements, changes in appearance, voice characteristics and vital signs (e.g., heart rate and temperature).

For example, the device 10 includes an optical sensor 36 that incorporates one or more devices for sensing optical signals, such as a camera, infrared detector and/or other sensors configured to detect electromagnetic radiation. The optical sensor 36 can be used for recording biometric characteristics such as facial features, as well as for recording eye movements and user gaze directions. A microphone 38 or other sound recording device may be included for recording voice commands and recording changes in voice or other audible indicators, which can be useful for receiving commands as well as detecting changes in user stress or behavior. One or more biometric sensors 40 may be included to measure various body characteristics. Examples of biometric sensors 40 include temperature sensors, heart rate sensors and other sensors that can be used to track stress or fatigue. For example, a wearable sensor may be incorporated in a wearable device (e.g., a smartwatch) or be connected wirelessly to the device 10.

The device 10 is configured to, in response to an input, display textual data (also referred to simply as text) and other visual information in a region of a device's display area (e.g., smartphone screen or computer screen) based on biometric information including, for example, measurements of a user's gaze. As described herein, "gaze" refers to a direction or location at which a user's eyes are directed. "Text" or "textual data" refers to letters, numbers, symbols or any other visual information (e.g., pictures, emoticons, etc.) that can be displayed in the region of the display area. The device 10 displays the textual data at a location or region of a display area in response to characteristics of the user's gaze or visual focus. In one embodiment, the textual data is displayed at a fixed position relative to the region in the display area. Successive components of the textual data, such as individual words (along with punctuation as necessary) or phrases, are sequentially displayed. Each component is displayed in a stationary or fixed location within the region. The region itself may be fixed within the display area or moveable in response to factors such as available space on the display area and/or the direction of the user's gaze.

In one embodiment, the region is a reticle, which is a location or region within the display area within which textual data is fixedly displayed. The reticle may include visual features such as a boundary and/or differently colored areas that define the region in which data is displayed, and may also include lines or other features that indicate the center of the region of otherwise indicate a location at which displayed data is centered.

Figure 2:
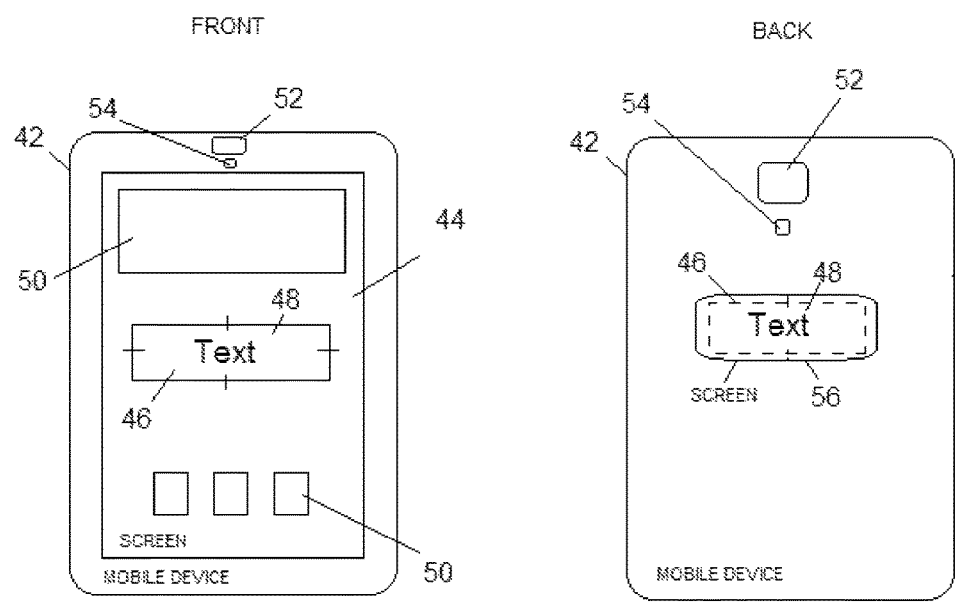
FIG. 2 depicts an embodiment of a mobile device in accordance with an embodiment.

FIG. 2 shows an example of the device 10 configured as a mobile device 42 such as a smartphone. The mobile device 42 includes a screen 44 that defines a display area. The display area is exemplary and not limited to the specific device or configuration shown in FIG. 2. A reticle 46 is positioned by the device and establishes the location at which textual data is displayed. The textual data may be displayed in response to any input, such as receipt of a text message or email, execution of an electronic document or book and any other input. Although the information displayed is described in embodiments and examples as textual or alphanumeric information, the information is not so limited and may be any visual information (e.g., symbols, pictures, etc.).

The reticle 46 is the location at or within which text 48 is displayed. The text is displayed at a fixed location relative to the reticle 46, although the reticle itself may be moveable in response to user input, biometric information or other factors. For example, the reticle 46 may be moved or positioned based on user input (e.g., moving a mouse or dragging via a touchscreen), eye movement or changes in gaze direction, or available space on the screen 44 relative to other visual information 50 displayed on the screen 44. Examples of other visual information include windows or displays related to other applications and icons. The position of the reticle 46, control of text display and/or speed of text displayed can be accomplished via optical sensors such as one or more cameras 52 and one or more infrared sensors 54.

The display area may be any type of display, such as a computer screen, touchscreen, virtual reality display, holographic display or heads up display. In one embodiment, the display area is a secondary or supplemental display or screen that can be activated or accessed separately from a primary or main display of a device.

For example, the display area on which the reticle 46 and/or textual information is displayed includes the primary screen 44 and/or a second screen 56 located on the back of the mobile device 42 or otherwise located separately from the primary screen 44. The second screen 56 may be a dedicated screen that forms the reticle and is configured to display successive words or other textual components in a fixed position within the screen 56. Alternatively, the second screen 56 is larger than the reticle size and can accommodate additional display and/or movement of the reticle 46. The second screen could provide a number of functions, including for example allowing the user to read messages without activating the primary screen (or allowing the primary screen to remain dim to save power). The reticle 46 formed by or in the second screen 56 can be activated by an incoming message, notification, email or other textual information based on gaze detection indicating that a user is looking at the screen and/or biometric measurements confirming the user's identity. The second screen 56 may have any position, size or shape, and is not limited to the embodiments described herein.

In one embodiment, the text 48 is displayed sequentially in place within the reticle 46 (e.g., in the primary or second screen). For example, each word in a message or document is displayed (e.g., swapped or flipped) in place so that each word is displayed for a selected period of time and then replaced by the next word in the message or document. The display speed corresponds to the rate at which words are displayed, i.e., higher speeds correlate with smaller periods of time during which each word is displayed. The display speed may be selected based on the context of the text being displayed. For example, the period of time between words may be faster than the period of time between sentences, paragraphs, pages, chapters, etc. Sequential display within a reticle is distinguished from scrolling, in which words or portions of text or documents are moved along a display while a user is reading.

For example, when a message, book, document or other textual data is selected to be displayed, the first word (or other textual data component) is displayed and held in place within the reticle for a selected period of time or time window. Upon expiration of the time window, the next word (or other successive textual data component) immediately following the first word replaces the first word and is fixedly displayed in the reticle 46 for the selected time window. The transition between words may be achieved by simply removing the word and immediately displaying the next word, or via some type of animation (e.g., fading, flipping).

Sequentially displaying fixed words may be employed to facilitate the speed of reading and reduce stress and/or fatigue of the user. For example, when a user reads text displayed as a series of lines and/or scrolled along the screen, the eye moves in a series of short stops, referred to as saccades. By sequentially displaying fixed individual words (or short groups of word), the occurrence and severity of saccades is substantially reduced and/or at least substantially eliminated.

Figure 3:
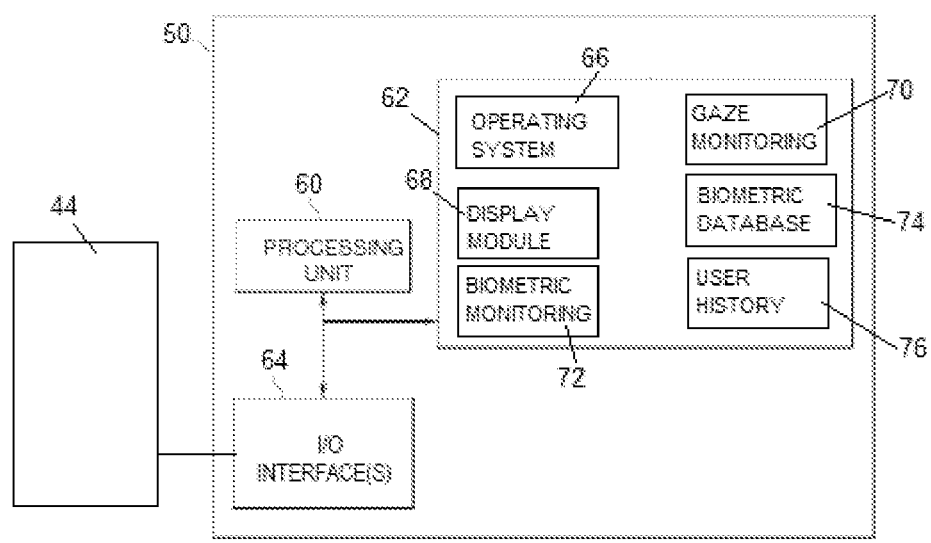
FIG. 3 depicts examples of processing modules configured to perform aspects of embodiments of a method of displaying textual data.
Figure 4:
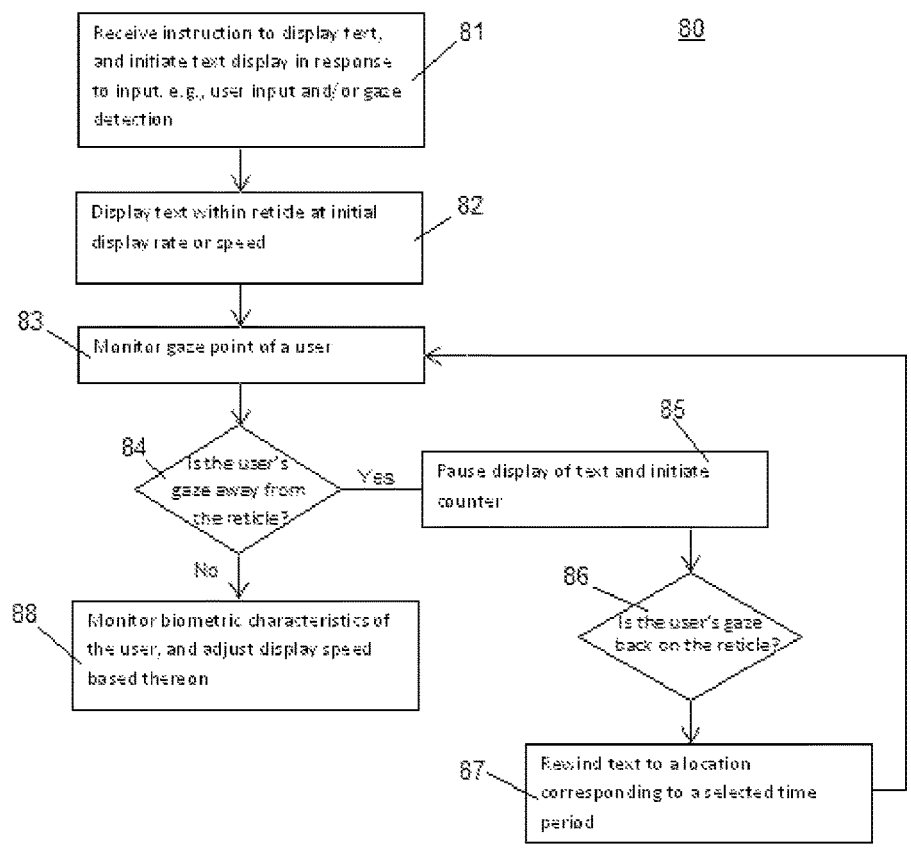
FIG. 4 depicts a process flow for displaying textual data in accordance with an embodiment.

FIG. 3 illustrates an embodiment of a program suite that includes various processing modules configured to perform aspects of the methods described herein. The program suite in this embodiment is embodied in the mobile device 42, but can be embodied in the device 10 or any other processing device or system.

The mobile device 42 includes a processor or processing unit 60 connected to a memory 62 and the screen 44 and/or second screen 56 via an appropriate interface 64. One or more processing modules are stored in the memory, including an operating system 66 and a display module 68 that controls aspects of displaying textual data in the reticle 46 and/or the location of the reticle 46. A gaze monitoring module 70 interacts with sensors such as a camera to track a user's gaze, and provides information to the display module 68 including whether the user's gaze point is at the reticle 46. A biometric monitoring module 72 interacts with sensors such as a heart rate monitor and provides information to the display module 68, such as an indication that the user is frustrated or experiencing stress, which can be used by the display module 68 to reduce or otherwise control the display speed.

The modules may also interact with stored information that can be used to facilitate controlling the display of textual data. For example, a biometric database 74 can be accessed to correlate measurements of biometric characteristics with, e.g., stress or frustration. In another example, a user history database 76 can be accessed and used to store information regarding a specific user, such as preferred display speed, calibration data to associate eye and/or facial measurements with gaze point, and calibration data to correlate facial measurements and biometric measurements with stress.

FIG. 3 illustrates an embodiment of a method 80 of displaying textual data. Although the method 80 is described in conjunction with the device 42, the method 80 can be utilized in conjunction with any of the processing devices and systems described herein, such as the device 10, as well as with any device or system that includes display capability. The method 80 includes a plurality of stages represented by blocks 81-88, all of which can be performed sequentially. However, in some embodiments, one or more of the stages can be performed in a different order than that shown or fewer than the stages shown may be performed.

At block 81, an instruction is received at the device 42 to display a set of textual data, such as a message or document. The message is displayed in response to an input, such as a user opening the message or otherwise initiating execution of the display.

In one embodiment, the user input includes detection of the user gaze and determining whether the point of gaze is on the display area, e.g., the screen 44. The device may initiate display upon detection of the point of gaze on the screen. If the point of gaze is away from the screen, the device 42 may provide an indication to the user in the form of an auditory and/or tactile alert (e.g., vibration).

In one embodiment, the reticle 54 is displayed at a portion of the screen 44 based on available space on the screen and/or the point of gaze of the user. The reticle 46 may be located at a fixed position on the screen 44 or may be variable, i.e., the reticle may be moved in response to an input. For example, the user may directly move or position the reticle 46, e.g., by moving a mouse or using a touchscreen. In one embodiment, the reticle 46 is automatically positioned or moved based on available space. For example, if windows executing other applications are opened, moved or resized, the reticle 46 is moved and/or resized to remain visible to the user.

At block 82, text is displayed in the reticle 46 by sequentially displaying words or portions of the text in the reticle as a text stream. In one embodiment, the text is displayed at a stationary location relative to the reticle 46, e.g., each word is displayed for a selected period of time and then replaced with a subsequent word, phrase or portion of text. For example, words are sequentially flipped according to a selected display speed.

The initial display speed may be selected at a default rate or at a user selected rate. For example, the initial speed is selected as an average reading speed of users, e.g., 120-200 words per minute. This corresponds to a new word being displayed every 0.3-0.5 seconds. This speed may be any speed selected by a user or based on a user's historical speed.

In one embodiment, the initial display speed is selected based on an individual user by allowing the user to select a display speed or by accessing user information stored previously, e.g., by the device 42 during previous reading sessions. For example, the device may access historical reading speeds stored in the user history database 76 or other suitable location. User information for multiple users may be stored, so that a user can be identified and appropriate display speeds selected.

At block 83, the user's gaze is monitored by, e.g., the gaze monitoring module 70. In one embodiment, an optical sensor or sensors measures eye position and/or motion. For example, video and/or infrared based sensors measure features of the user's eye such as the cornea, the pupil, the back of the lens, retinal blood vessels and others, and tracks the features to determine the user's gaze point. The "gaze point" refers to an estimated location at which the eye is directed. In embodiments where fixed word display in a reticle is used, tracking saccades may not not necessary, as the eye is substantially centered toward the reticle when reading.

Other biometric indicators may also be used to track the user's gaze. For example, the relative position of various facial features and/or distance between such features (e.g., eyes, nose, chin, etc.) can be used to determine the direction of the user's gaze. Biometric facial information stored in, e.g., the biometric database 74, the user history database 76 and/or other locations, may be used to correlate facial measurements with gaze direction and gaze point.

At block 84, based on monitoring the gaze point, the device 42 determines whether the user's gaze is away from the reticle 46, i.e., whether the gaze point is not at least substantially at a location within or at the reticle 46.

At block 85, the text stream is paused in response to the device 42 detecting that the user's gaze is away from the reticle 46 and the gaze point is no longer at the reticle 46. This may occur due to the user looking away from the screen or closing his or her eyes. The amount of time during which the user's gaze is away may be measured, e.g., by initiating a counter or other time measurement mechanism. At block 86, the gaze point is continuously monitored to determine whether the gaze point has returned to the reticle 46.

At block 87, in response to the gaze point returning to the reticle 46, display of the text stream is resumed from a point in the text stream that precedes the point at which the user's gaze was broken. In one embodiment, the text stream is resumed at a preceding point corresponding to a selected period of time. As a result, the text stream does not resume exactly at the point in the text stream that was displayed, but rather backs up so that the user can retain comprehension.

The time period used to rewind the text stream may be any suitable time period, selected by a user or calculated by the device 42. For example, the device 42 selects the time period based on the display speed to rewind further for slower display speeds and corresponding reading speeds.

In one embodiment, the device 42 monitors the text stream for contextual boundaries representing breaks in the text. Exemplary logical boundaries include sentence breaks, paragraph or page breaks, and any other location. When the user's gaze is broken, the device selects a preceding contextual boundary in the text, calculates the time period based on the display speed and the location of the boundary, and the text stream is rewound by the time period and display is resumed.

During display of the text stream, at block 88, biometric characteristics of the user are monitored and the display speed is controlled or adjusted based on the measured characteristics. For example, the device monitors the user's facial expression and reduces the display speed in response to detecting facial expressions indicative of stress or frustration, e.g., narrowed eyes (which indicate that the user is focusing too much) or facial expressions indicating frustration or anger. Biometric characteristics may also be monitored for indications of fatigue, in response to which the display speed may be reduced. Other biometric characteristics may be monitored for indications of stress, such as heart rate or temperature measurements, pressure measurements (e.g., indicating that the user is gripping the device 42 excessively), skin contact measurements and movement monitoring. In addition, other factors besides biometric information may be considered in determining or adjusting display speed. For example, the time of day is determined and the display speed may be adjusted accordingly, e.g., reduced in the evening or night and/or increased in the morning.

In one embodiment, a data store of facial expression metrics and/or other biometrics includes data associating measurements with stress. The measurements may be associated with stress based on general criteria or individualized criteria. Examples of the data store include the biometric database 74 and the user history database 76. The metrics may customized to the user, e.g., by learning over time or by interacting with the user (e.g., via a calibration) to determine whether the user is under stress or frustrated. In response to detecting user stress, the device automatically reduces the speed to a selected level. For example, the device gradually reduces the speed until the user's biometric measurements indicate that the user is no longer under stress. The speed may be maintained at the previous speed or may be increased over time.

Alternatively, biometric information can be used to increase speed, e.g., to encourage the user to read faster. For example, during reading, the device 42 may incrementally or gradually increase the text stream display speed, during which the biometric characteristics are monitored. If the characteristics indicate that the user is under stress or beginning to struggle, the rate may be stabilized or slightly reduced.

Technical effects and benefits include the ability to automatically pause a textual data stream without requiring a user to actively pause the text stream. The embodiments described herein allow a user to direct attention elsewhere and retain comprehension when attention is returned to reading by automatically rewinding the text stream so that comprehension is not lost. In addition, the embodiments described herein provide an effective way to increase reading speed, and facilitate efficient reading speeds by automatically adjusting display speeds based on biometric feedback to allow a user to read at an optimal but comfortable pace.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of displaying textual data, the method comprising:
receiving, by a processor, a request to display textual data;
displaying, by the processor, textual data in a reticle region within a display area, wherein the reticle region is moveable with respect to the display area, and wherein displaying textual data includes sequentially presenting successive components of the textual data at a fixed position relative to the reticle region within the display area;
monitoring a point of gaze of a user based on biometric information;
based on detecting that the point of gaze is away from the reticle region, automatically stopping the displaying by the processor at a current time point at which a current component is displayed, and determining a previous component of the textual data that was displayed at a previous time point, the previous time point occurring a rewind time period prior to the current time point, wherein the rewind time period between the previous time point and the current time point is determined based at least in part on a reading speed of the user; and
based on detecting that the point of gaze has returned to the reticle region, displaying, by the processor, the previous component associated with the previous time point and continuing to display successive components of the textual data subsequent to the previous component.

2. The method of claim 1, wherein the displaying includes detecting whether the point of gaze is at the reticle region within the display area.

3. The method of claim 1, wherein the displaying includes presenting the successive components at a display speed corresponding to an initial time window during which each successive component is presented in the reticle region.

4. The method of claim 3, further comprising monitoring at least one biometric characteristic of the user during the displaying, and controlling the display speed based on the at least one biometric characteristic.

5. The method of claim 4, wherein the monitoring the at least one biometric characteristic includes detecting whether the user is experiencing at least one of stress and fatigue.

6. The method of claim 5, wherein the controlling the display speed includes reducing the display speed by the processor in response to determining that the user is experiencing at least one of stress and fatigue.

7. The method of claim 1, wherein the monitoring the point of gaze includes receiving biometric data from at least one sensor, the biometric data indicating at least one of eye movement and a position of one or more components of an eye.

8. The method of claim 1, wherein the reticle region of the display area is defined by a reticle on which successive textual data components are displayed.

9. The method of claim 1, wherein sequentially presenting successive components of the textual data comprises presenting a first word for a period of time, and, responsive to expiration of the period of time, implementing an animation transition before presenting a second word.

10. The method of claim 9, wherein the animation transition is a fading transition.

11. The method of claim 9, wherein the animation transition is a flipping transition.

* * * * *